United States Patent
Nugent et al.

(10) Patent No.: US 6,802,308 B1
(45) Date of Patent: Oct. 12, 2004

(54) COLLAPSIBLE BARBECUE APPARATUS

(76) Inventors: Tim M. Nugent, 1070 Marco Pl., Venice, CA (US) 90291; Chris W. Glupker, 6708 Gaviota Ave., Van Nuys, CA (US) 91406; Lance G. Hussey, 84 High Knoll Ct., Simi Valley, CA (US) 93065; Ravi K. Sawhney, 23327 Park Colombo, Calabasas, CA (US) 91302; Kurt G. Botsai, 2102 La Granada Dr., Thousand Oaks, CA (US) 91362; Val Kalyuzhny, 8028 Wynne Ave., Reseda, CA (US) 91335

( * ) Notice: Subject to any disclaimer, the term of this patent is extended or adjusted under 35 U.S.C. 154(b) by 0 days.

(21) Appl. No.: 10/405,525

(22) Filed: Apr. 1, 2003

(51) Int. Cl.[7] .............................. F24C 5/20; A47J 37/00
(52) U.S. Cl. ....................... 126/38; 126/41 R; 126/9 R; 126/50
(58) Field of Search ................................ 126/9 R, 9 A, 126/25 R, 38, 40, 50, 37 R, 304 R, 305, 306, 37 A, 304 A, 41 R; 108/115, 118, 101, 186, 190, 185; 99/467, 482

(56) References Cited

U.S. PATENT DOCUMENTS

| ,007 A | 8/1836 | Blanchard |
|---|---|---|
| 2,467,480 A | 4/1949 | Hudson |
| 3,490,433 A | 1/1970 | Busenbarrick |
| 3,593,701 A | 7/1971 | Youmans |
| 3,599,624 A | 8/1971 | Gehring |
| 3,692,013 A * | 9/1972 | Grafton et al. ............ 126/41 R |
| 4,046,132 A * | 9/1977 | White ......................... 126/9 R |
| 4,140,099 A | 2/1979 | Newport |
| 4,167,175 A * | 9/1979 | Malafouris ................ 126/25 C |
| 4,177,720 A | 12/1979 | Schmidt |
| 4,453,529 A | 6/1984 | Spencer et al. |
| 4,526,158 A | 7/1985 | Lee |
| 4,548,192 A | 10/1985 | Hsu |
| 4,621,608 A | 11/1986 | Lee |
| 4,884,499 A | 12/1989 | Rensch et al. |
| 4,896,650 A | 1/1990 | Hait |
| 4,905,582 A | 3/1990 | Lee |
| 4,920,950 A | 5/1990 | Johnson |
| 4,924,844 A | 5/1990 | Bransburg |
| 5,243,961 A | 9/1993 | Harris |
| 5,575,195 A | 11/1996 | Foxford |
| D413,760 S | 9/1999 | Tsai et al. |
| 6,073,542 A | 6/2000 | Perez |
| D435,755 S | 1/2001 | Deni |
| 6,513,515 B1 * | 2/2003 | Wu ........................... 126/41 R |

* cited by examiner

*Primary Examiner*—James C. Yeung
(74) *Attorney, Agent, or Firm*—Kelly Lowry & Kelley, LLP

(57) ABSTRACT

A collapsible barbecue apparatus includes a base housing a fuel supply. First and second wings are pivotally attached to the base and movable between a closed position wherein the wings face one another, and an open position wherein the wings are generally co-planar with one another. Each wing includes a grill cooking surface and an underlying gas burner. First and second supports are movable from a retracted position adjacent to the base to extended positions for supporting the first and second wings, respectively.

27 Claims, 5 Drawing Sheets

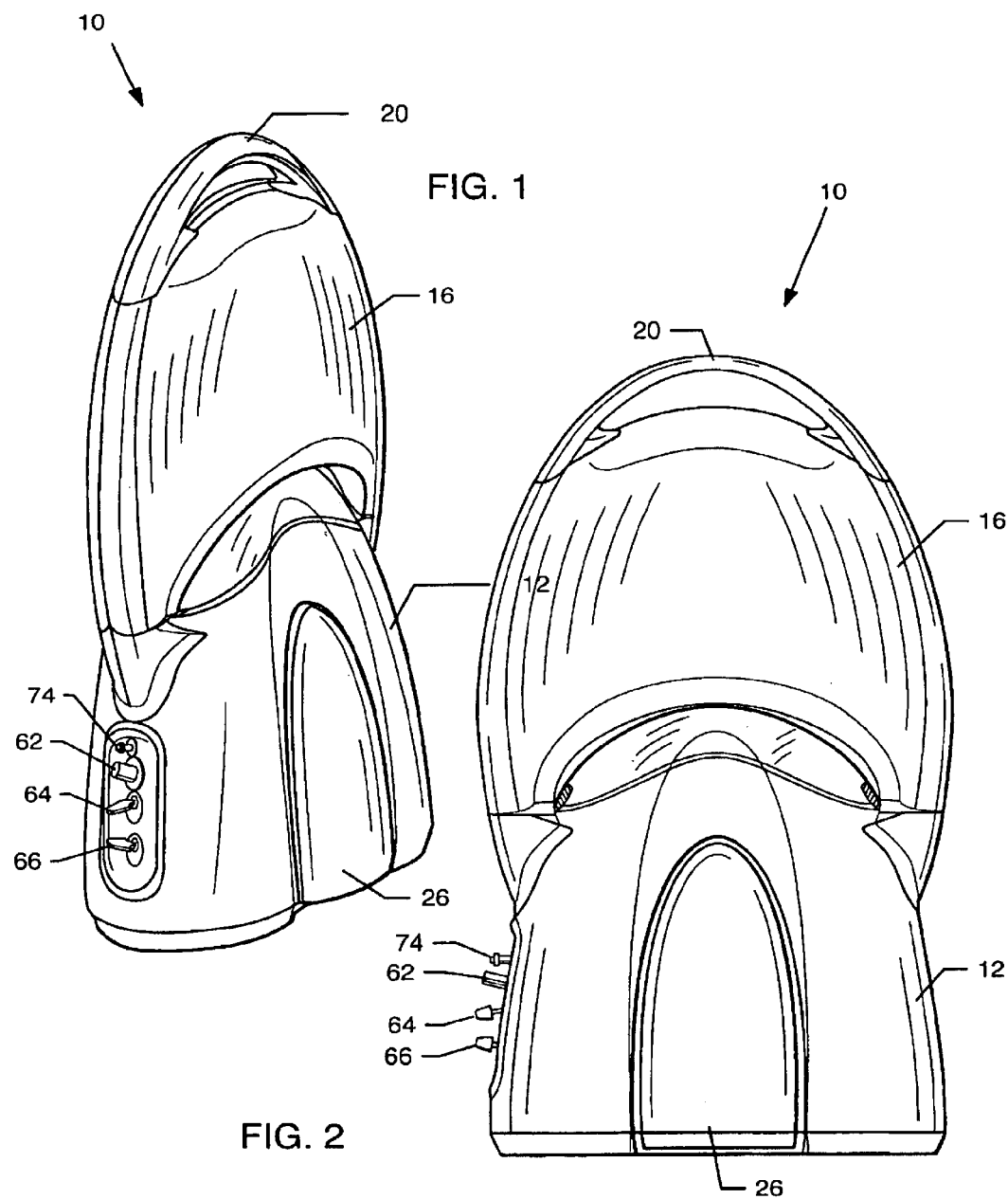

COLLAPSIBLE BARBECUE APPARATUS

BACKGROUND OF THE INVENTION

The present invention generally relates to barbecues and the like. More particularly, the present invention relates to a collapsible barbecue apparatus which is transportable so as to be used either indoors or outdoors.

Barbecues, camping stoves, and the like are well-known. Often, such barbecues are rather large and stored on a patio or a deck of a homeowner. Once assembled, the barbecue can only be moved to a limited extent with the use of a pair of wheels at one lower end thereof. Oftentimes, such a large barbecue device is not required, or not even feasible. For example, many people live in town homes, condos, or apartments which do not provide sufficient space for such a large barbecue device.

There are, however, many collapsible and portable barbecuing devices. For example, U.S. Pat. No. 4,884,499 to Rensch et al. discloses a portable grill comprised of fuel pans which are removable between horizontal and vertical positions and which include removable grates which confine charcoal brickettes within the fuel pan. The grill device is extended in use, and can be folded and collapsed for storage. However, such device utilizes charcoal, prohibiting its use indoors. Also, the use of charcoal brickettes requires that the ashes from such brickettes be disposed of immediately after use and before the grill is collapsed and stored.

Another known collapsible barbecue grill is disclosed in U.S. Pat. No. 3,593,701 to Youmans. This barbecue grill employs vertically adjustable grills which are pivotally attached to the center post. A flexible, heat-resistant material, e.g. asbestos cloth, forms a fire pan when open for supporting charcoal brickettes. Once again, however, even though the grill is collapsible in nature so as to be easily stored and transported, the device requires the storage of charcoal brickettes and disposal of the ashes from such brickettes after use before the device can be collapsed and stored. Furthermore, asbestos cloth is no longer offered commercially due to the health hazards associated therewith.

There are also known propane gas grills which are relatively small and portable. Such typically comprise an underlying pan housing the gas burner, a grill disposed over the lower pan, and an upper pan serving as a lid. The fuel source, typically a propane tank, is typically attached to an inlet nozzle at the side of the grill. Such barbecue grills are often used in camping settings. However, such grills are esthetically unpleasing and rarely used indoors.

Accordingly, there is continuing need for a compact and collapsible barbecue apparatus. Such an apparatus should be gas-based so as not to require the time and mess associated with charcoal grills. Such a grill should be portable so as to be used both indoors and outdoors. Also, the grill should be esthetically pleasing. The present invention fulfills these needs and provides other related advantages.

SUMMARY OF THE INVENTION

The present invention resides in a barbecue apparatus which is collapsible to render it easy to store and transport. The barbecue apparatus of the present invention is also esthetically pleasing and easy to use.

The barbecue apparatus generally comprises a base having a first wing attached thereto and pivotable between a closed position wherein the wing is generally aligned with the longitudinal axis of the base, and an open position generally perpendicular thereto. A second wing is similarly attached to the base and pivotable between a closed position wherein the wing is generally aligned with the longitudinal axis of the base, and an open position generally perpendicular thereto. The first and second wings include first and second grill cooking surfaces, respectively. First and second cooking surfaces face one another when the wings are in their closed positions, and are generally co-planar when the wings are in their open positions. Preferably, the cooking grills are removably attached to the first and second wings. A heating unit, preferably a gas burner, is disposed in at least one, and preferably both of the first and second wings. An electric igniter is disposed adjacent to the one or more gas burners.

A source of combustible fuel is operably connected to the gas burner. In a particularly preferred embodiment, the source of fuel comprises one or more propane tanks disposed within the base.

Distal ends of the first and second wings cooperatively form a handle when the wings are in the closed position. Preferably, a latch is associated with the handle for locking the handle in the closed position.

A first support is movable from a retracted position adjacent to the base to an extended position for supporting the first wing in the opened positioned. Similarly, a second support is movable from the retracted position adjacent to the base to an extended position for supporting the second wing in an open position. The supports each include collapsible arms which retract into and extend from the base. Preferably, the supports nest within side walls of the base in their retracted position. A grease cup may underlie either the first or second wing, and typically held in place by the supports.

In a particularly preferred embodiment, the base includes a light source of illuminating the barbecue apparatus when in use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a collapsible barbecue apparatus embodying the present invention;

FIG. 2 is a side elevational view of the barbecue apparatus;

DETAILED DESCRIPTION OF THE PREFERRED EMBODIMENT

Figure 3:
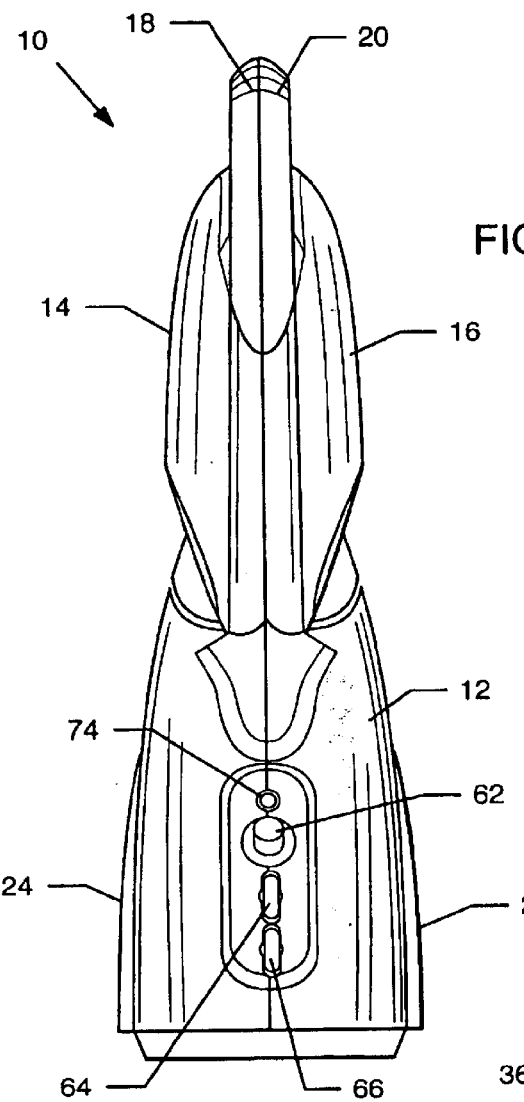
FIG. 3 is an end elevational view of the barbecue apparatus.

As shown in the accompanying drawings for purposes of illustration, the present invention resides in a barbecue apparatus, generally referred to by the reference number 10. As shown in FIGS. 1–3, the barbecue apparatus 10 of the present invention can be folded for storage in a very compact, yet esthetically pleasing manner. The barbecue apparatus 10 of the present invention generally comprises a base 12 having a major vertical axis so as to be relatively thin and vertically oriented. Wings 14 and 16 are pivotally connected to the base 12 at an upper end thereof and movable between closed positions, illustrated in FIGS. 1–3, so as to be generally aligned with the longitudinal axis of the base 12 for storage purposes; and an open position, as illustrated in FIG. 5, wherein the wings 14 and 16 are generally horizontal and generally co-planar with one another.

Figure 6:
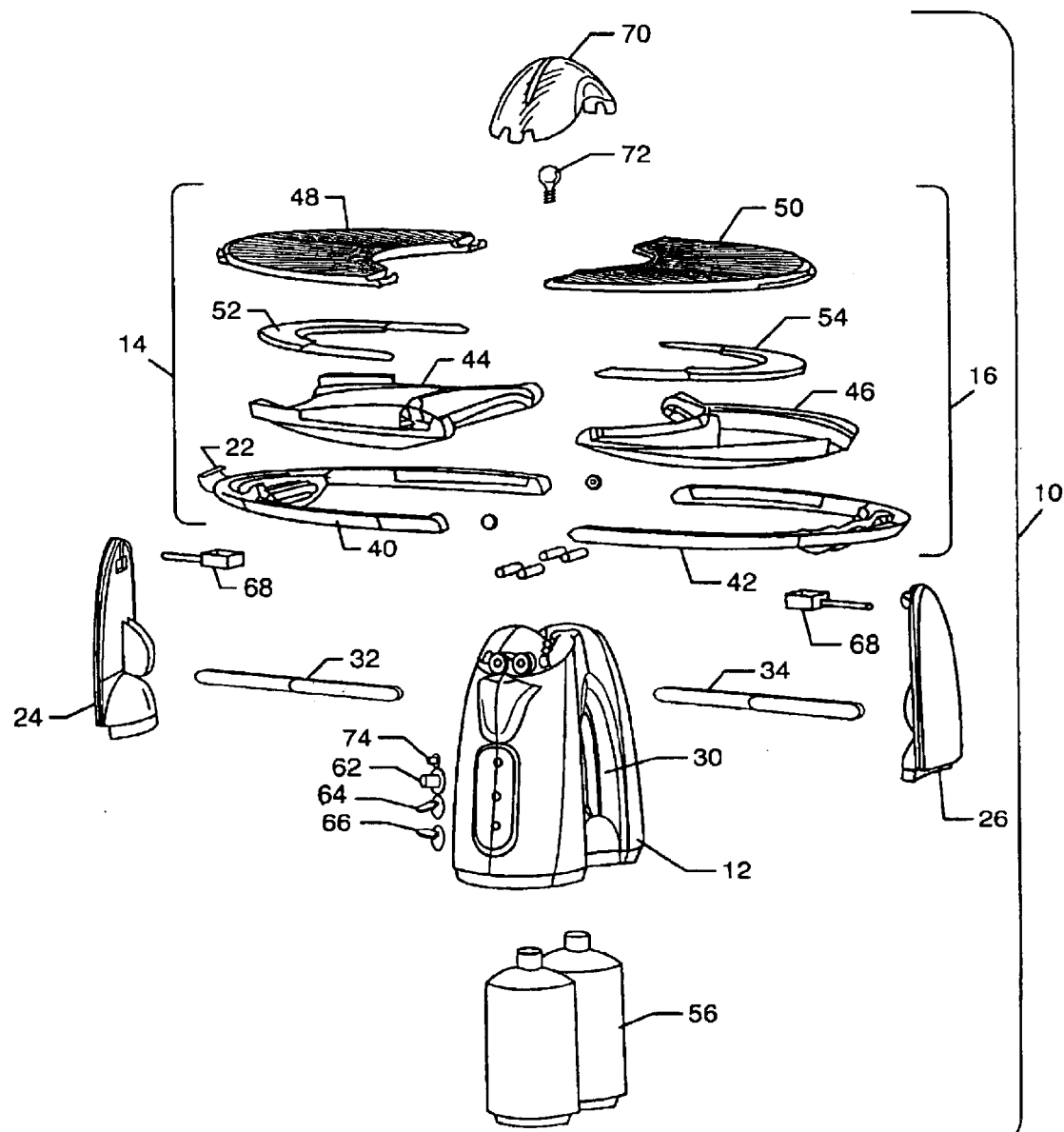
FIG. 6 is an exploded perspective view of the various component parts of the barbecue apparatus of the present invention.

Distal ends 18 and 20 of the wings are formed such so as to create a handle, as illustrated in FIGS. 1–3, when the wings 14 and 16 are brought towards one another in the closed position. Preferably, a latch 22, such as that illustrated in FIG. 6, is provided for locking the handles 18 and 20 to one another to maintain the apparatus 10 in the closed position. Such a latch may be a pivoting member, as illustrated, wherein the latch 22 is hinged over the opposite handle end 20 and snapped into place or the like.

Figure 5:
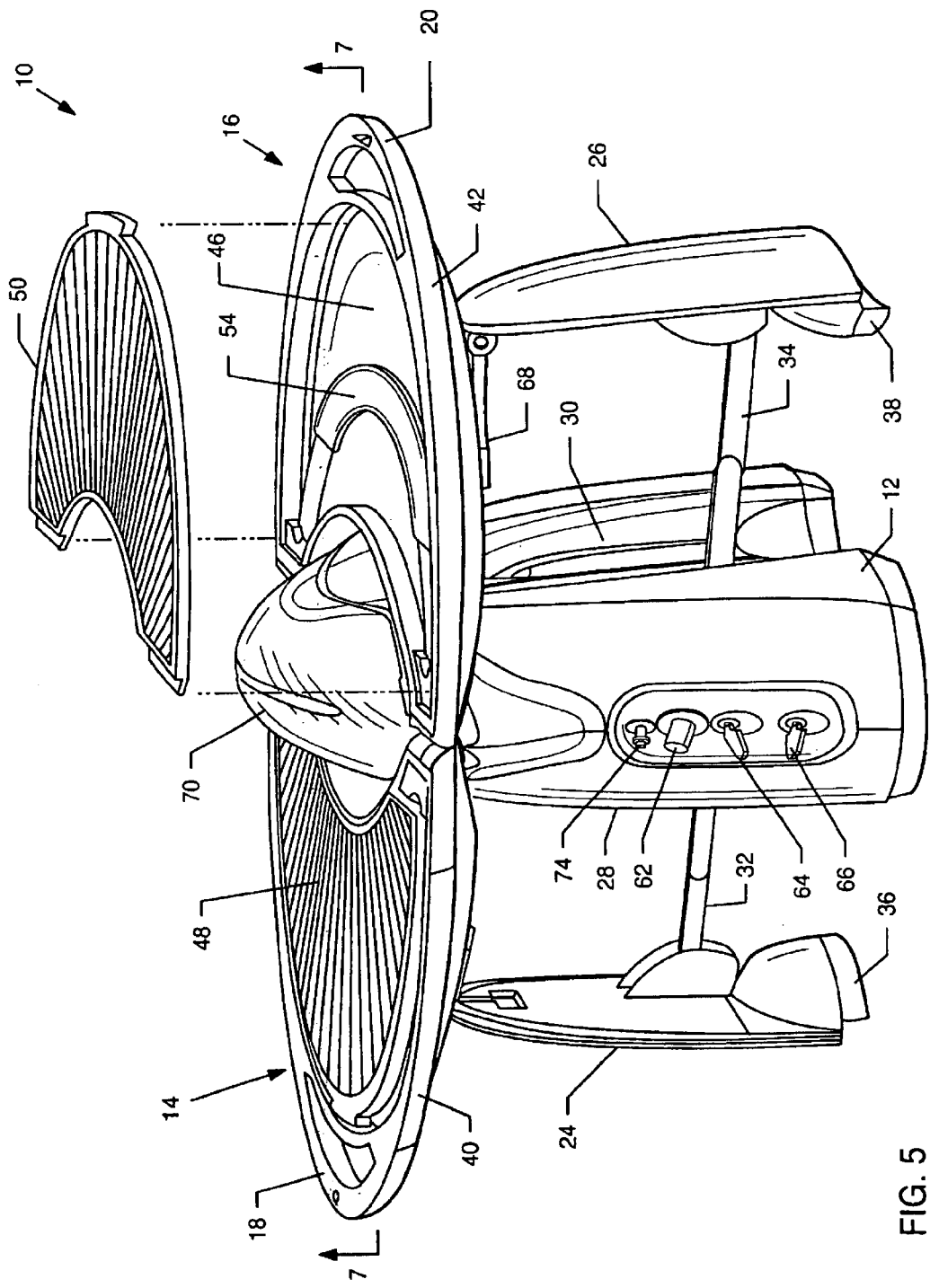
FIG. 5 is a partially exploded perspective view of the barbecue apparatus in an unfolded and operating state.
Figure 7:
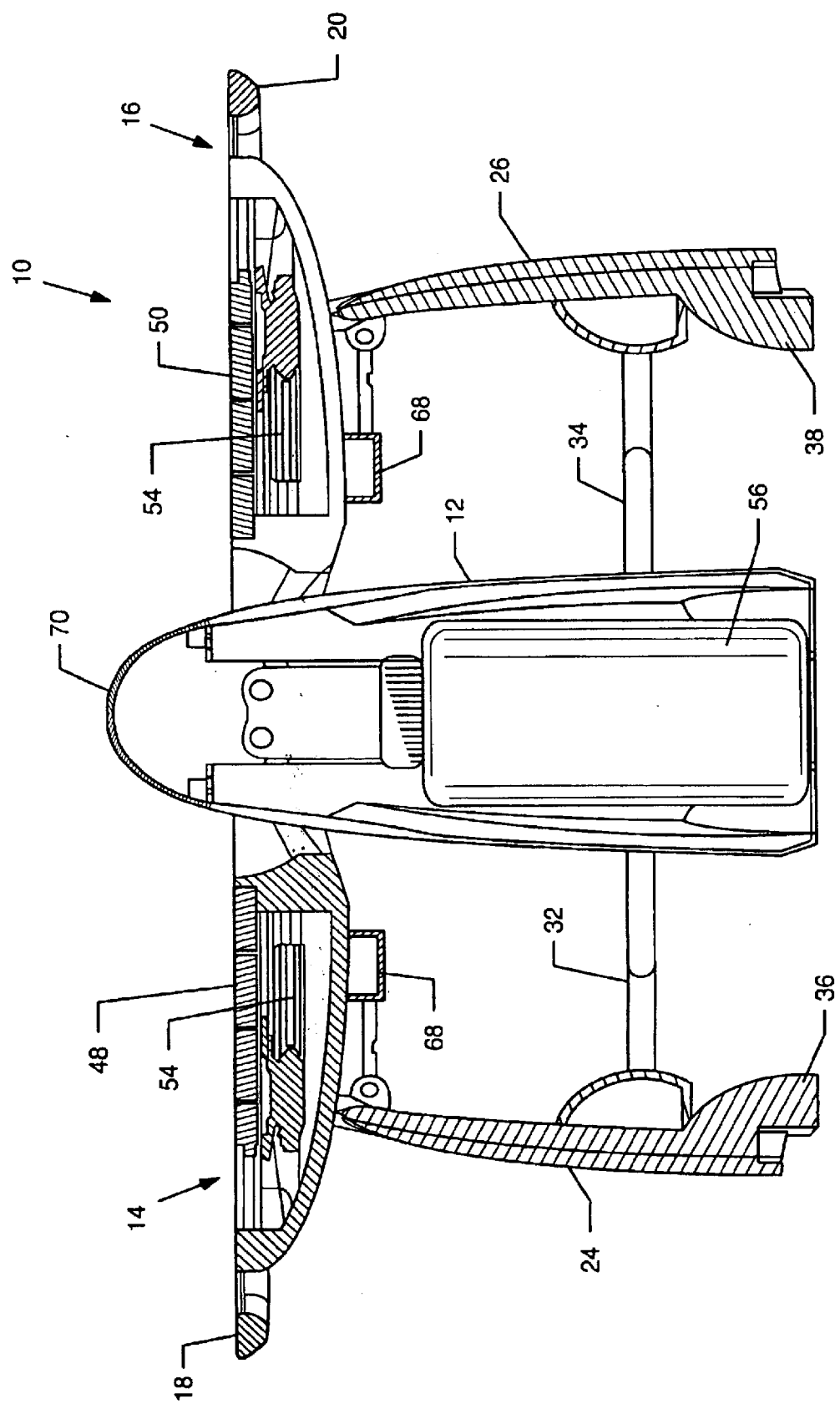
FIG. 7 is a cross-sectional view taken generally along line 7—7 of FIG. 5.

With reference now to FIGS. 5–7, the wings 14 and 16 can be pivoted downwardly so as to lie generally horizontal and expose the cooking surfaces thereof. In a particularly preferred embodiment, supports 24 and 26 extend outwardly from the base 12 to support the respective wings 14 and 16 in the generally horizontal position. These supports 24 and 26 are configured to nest within recesses 28 and 30 of the base so that when the supports 24 and 26 are in their retracted position, they appear to be part of the base 12. The supports 24 and 26 are connected to the base 12 by telescoping or hinged arms 32 and 34 which are capable of being extended outwardly from the base 12 to position the support 24 or 26 under its respective wing 14 and 16, and retracted back towards the base 12 to enable the supports 24 and 26 to nest with the base 12. Preferably, each support 24 and 26 includes a support foot or base 36 and 38, respectively, which provides a platform or support with the ground or resting surface so that the apparatus 10 is secure and stationary in the in-use and open position. An upper end of each support 24 and 26 may include an elastomeric pad, or be configured to be received within an indentation of the outer surface of the wing 14 and 16 so that a stable connection is made therebetween.

With continuing reference to FIGS. 5–7, and particularly FIG. 6, the wings 14 and 16 in a particularly preferred embodiment each include an outer rim 40 and 42, the distal ends 18 and 20 of which form a handle. Generally concave sidewalls 44 and 46 are attached to, or formed with the rims 40 and 42. Typically, the sidewalls 44 and 46 are comprised of metal, such as aluminum or sheet metal. The outer rims 40 and 42 may be comprised of a hardened plastic material, or formed integrally with the sidewalls 44 and 46. Semi-circular grills 48 and 50 overlie the sidewalls 44 and 46. The grills 48 and 50 form a cooking surface upon which meat, vegetables, or other food to be cooked is placed. In a particularly preferred embodiment, as illustrated in FIG. 5, the grills 48 and 50 are removably attached to the wings 14 and 16 so that they can be cleaned separately.

Heating units in the form of gas burners 52 and 54 are disposed between the sidewalls 44 and 46 and the grills 48 and 50, respectively. Such gas burners are typical for gas or propane barbecues in that they have a hollow interior which allows the combustible gas to enter therein, and a series of apertures on an outer edge thereof (not shown) which allow the gas to escape and become ignited to cook the food on the grills 48 and 50.

Figure 4:
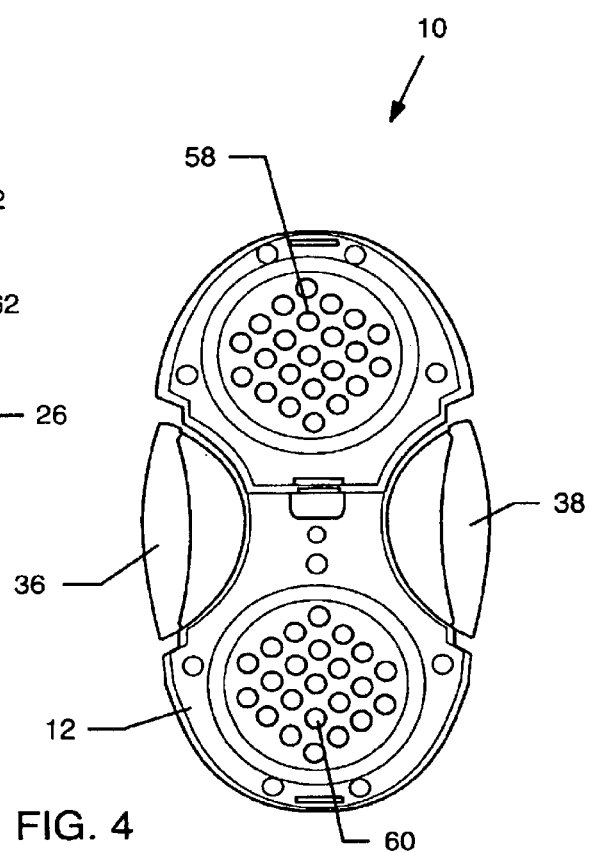
FIG. 4 is a bottom plan view of the barbecue apparatus.

A source of combustible fuel, such as propane tanks 56 are operably connected to the burners 52 and 54. In a particularly preferred embodiment, as illustrated, the propane tanks 56 are disposed within the base 12, and include conduits extending to the gas burners 52 and 54. The base 12 is generally hollow and configured to receive a pair of propane tanks 56. Each propane tank 56 may be connected to a respective burner 52 and 54, or a single propane tank 56 may be connected to both burners 52 and 54, the other propane tank 56 acting as a reserve. In any event, as illustrated in FIG. 4, the base includes bottom doors 58 and 60 which can be removed or opened for the insertion and removal of the propane tanks 56 therein. The doors 58 and 60 can be closed shut and locked to prevent the propane tanks 56 from falling from without the base 12 as the apparatus 10 is carried from one location to another.

Although the gas exiting from the burners 52 and 54 can be ignited by a match or exterior flame, in a particularly preferred embodiment, the apparatus includes an electric igniter operable by switch 62 such that when switch 62 is depressed, a spark is generated and the propane exiting from the burner 52 or 54 is ignited.

Preferably, the gas supplied to each burner 52 and 54 is altered by gas flow dials 64 and 66. Thus, one burner 52 or 54 can be used to cook the meat, while the other burner 52 or 54 is used to merely keep the cooked food warm by lowering the gas output thereof, thus reducing the flame and cooking temperature. Such flow switches or dials 64 and 66 also enable the end user to quickly cook or sear the meat, or slowly cook the food as desired.

It will be appreciated by those who barbecue that during the cooking process juices, grease and liquid from the cooked meat and vegetables fall through the grill 48 and 50 as the food is cooked. In a particularly preferred embodiment, the sidewalls 44 and 46 are generally concave so that the drippings collected in the lowermost portion thereof. One or more apertures may be formed at this lowermost point and a dripping or grease cup 68 is positioned underneath the one or more apertures for collecting the grease and drippings. Typically, the grease cups 68 are pivotally attached to the supports 24 and 26 so that the grease cups 68 can be positioned underneath the cooking wings 14 and 16 during cooking, and retracted towards the supports 24 and 26 when the supports are retracted back into base 12. The grease cups 12 are detachably connected to the supports 24 and 26 so that they may be removed and the grease and other drippings disposed of and the grease cups 68 washed as necessary.

In the particularly preferred and illustrated embodiment, a clear or translucent dome 70 extends upwardly from the base so as to be positioned above the unfolded wings 14 and 16. A light source 72, such as a small light bulb is disposed within the dome 70. A source of power, such as batteries, are connected to the light bulb 72 and a switch 74 so that the light bulb can be selectively powered on and off. This enables the user to view the cooking surface grills 48 and 50, and the food thereon, while barbecuing during night time conditions. The light bulb 72 could also assist the unfolding and set-up of the apparatus 10 during low light conditions.

Although the barbecue apparatus 10 of the present invention can be offered in a variety of sizes, typically, the apparatus 10 is approximately two feet in height, and less than eight inches in width when folded for storage, as illustrated in FIGS. 1–3. This enables the apparatus 10 to be easily transported in a car or from a closet to a patio or the like. The compact nature of the apparatus 10 also enables it to be easily stored.

The apparatus 10 of the present invention offers many advantages. Unfolding the wings 14 and 16, as well as extending supports 24 and 26, are intuitive allowing easy use of the apparatus 10. The use of removable grease traps 68 and grills 48 and 50 also enable the apparatus 10 to be easily cleaned. As the apparatus 10 utilizes a gas fuel source, there is no need to remove and dispose of ash and unused brickettes. The apparatus 10 is also visually appealing and capable of being used indoors.

Although several embodiments have been described in detail for purposes of illustration, various modifications may be made without departing from the scope and spirit of the invention. Accordingly, the invention is not to be limited, except as by the appended claims.

What is claimed is:

1. A collapsible barbeque apparatus, comprising:
a base;
a first wing attached to the base and pivotable between a closed position wherein the wing is generally aligned with a longitudinal axis of the base, and an open position generally perpendicular thereto, the first wing including a first cooking surface;
a second wing attached to the base and pivotable between a closed position wherein the wing is generally aligned with the longitudinal axis of the base, and an open position generally perpendicular thereto, the second wing including a second cooking surface, wherein the first and second cooking surfaces face one another when the wings are in their closed positions, and wherein the first and second cooking surfaces are generally co-planar when the wings are in their open positions;
a heating unit disposed in at least one of the first and second wings;
a first support movable from a retracted position adjacent to the base to an extended position for supporting the first wing in the open position; and
a second support movable from a retracted position adjacent to the base to an extended position for supporting the second wing in the open position.

2. The barbeque apparatus of claim 1, wherein the heating unit comprises a gas burner.

3. The barbeque apparatus of claim 2, including a source of combustible fuel operably connected to the gas burner.

4. The barbeque apparatus of claim 3, wherein the source of fuel comprises a propane tank disposed within the base.

5. The barbeque apparatus of claim 2, including an electric ignitor disposed adjacent to the gas burner.

6. The barbeque apparatus of claim 5, wherein gas burners are disposed in both wings.

7. The barbeque apparatus of claim 1, wherein the supports include collapsible arms which retract into and extend from the base.

8. The barbeque apparatus of claim 7, including a grease cup underlying either the first or second wing.

9. The barbeque apparatus of claim 7, wherein the supports nest within side walls of the base.

10. The barbeque apparatus of claim 1, wherein each cooking surface comprises a cooking grill.

11. The barbeque apparatus of claim 10, wherein the cooking grills are removably attached to the first and second wings.

12. The barbeque apparatus of claim 1, wherein distal ends of the first and second wings cooperatively form a handle when the wings are in the closed position.

13. The barbeque apparatus of claim 12, including a latch for locking the handle in a closed position.

14. The barbeque apparatus of claim 1, wherein the base includes a light source for illuminating the barbeque apparatus when in use.

15. A collapsible barbeque apparatus, comprising:
a base;
a first wing attached to the base and pivotable between a closed position wherein the wing is generally aligned with a longitudinal axis of the base, and an open position generally perpendicular thereto, the first wing including a first grill cooking surface;
a second wing attached to the base and pivotable between a closed position wherein the wing is generally aligned with the longitudinal axis of the base, and an open position generally perpendicular thereto, the second wing including a second grill cooking surface, wherein the first and second cooking surfaces face one another when the wings are in their closed positions, and wherein the first and second cooking surfaces are generally co-planar when the wings are in their open positions;
a gas burner disposed in at least one of the first and second wings;
a source of combustible fuel operably connected to the gas burner;
an electric igniter disposed adjacent to the gas burner;
a first support movable from a retracted position adjacent to the base to an extended position for supporting the first wing in the open position; and
a second support movable from a retracted position adjacent to the base to an extended position for supporting the second wing in the open position.

16. The barbeque apparatus of claim 15, wherein the source of fuel comprises a propane tank disposed within the base.

17. The barbeque apparatus of claim 15, wherein gas burners are disposed in both wings.

18. The barbeque apparatus of claim 15, wherein the supports include collapsible arms which retract into and extend from the base, and wherein the supports nest within side walls of the base.

19. The barbeque apparatus of claim 15, including a grease cup underlying either the first or second wing.

20. The barbeque apparatus of claim 15, wherein the cooking grill surfaces are removably attached to the first and second wings.

21. The barbeque apparatus of claim 15, wherein distal ends of the first and second wings cooperatively form a handle when the wings are in the closed position, and wherein a latch is associated with the handle for locking the handle in a closed position.

22. The barbeque apparatus of claim 15, wherein the base includes a light source for illuminating the barbeque apparatus when in use.

23. A collapsible barbeque apparatus, comprising:
a base;
a first wing attached to the base and pivotable between a closed position wherein the wing is generally aligned with a longitudinal axis of the base, and an open position generally perpendicular thereto, the first wing including a first grill cooking surface;

a second wing attached to the base and pivotable between a closed position wherein the wing is generally aligned with the longitudinal axis of the base, and an open position generally perpendicular thereto, the second wing including a second grill cooking surface, wherein the first and second cooking surfaces face one another when the wings are in their closed positions, and wherein the first and second cooking surfaces are generally co-planar when the wings are in their open positions, wherein distal ends of the first and second wings cooperatively form a handle when the wings are in the closed position;

a latch associated with the handle for locking the handle in a closed position;

a gas burner disposed in each of the first and second wings;

a propane tank disposed in the base and fuel operably connected to the gas burner;

an electric igniter disposed adjacent to at least one gas burner;

a first support movable from a retracted position adjacent to the base to an extended position for supporting the first wing in the open position; and a second support movable from a retracted position adjacent to the base to an extended position for supporting the second wing in the open position.

24. The barbeque apparatus of claim 23, wherein the supports include collapsible arms which retract into and extend from the base, and wherein the supports nest within side walls of the base.

25. The barbeque apparatus of claim 23, including a grease cup underlying either the first or second wing.

26. The barbeque apparatus of claim 23, wherein the cooking grill surfaces are removably attached to the first and second wings.

27. The barbeque apparatus of claim 23, wherein the base includes a light source for illuminating the barbeque apparatus when in use.

* * * * *